United States Patent [19]

Faris

[11] Patent Number: 5,706,148

[45] Date of Patent: Jan. 6, 1998

[54] HARD DISK DRIVE WITH KINEMATICALLY MOUNTED DISK PLATTERS

[75] Inventor: Jeffrey E. Faris, Richardson, Tex.

[73] Assignee: Texas Instruments Incorporated, Dallas, Tex.

[21] Appl. No.: 777,850

[22] Filed: Dec. 31, 1996

[51] Int. Cl.$^6$ .................................................. G11B 17/08
[52] U.S. Cl. ........................................ 360/98.07; 360/99.08
[58] Field of Search .............................. 360/98.07, 99.08, 360/4

[56] References Cited

U.S. PATENT DOCUMENTS 4,788,464  11/1988  Nishikawa et al. ................. 310/268
5,537,272  7/1996  Kazmierczak et al. .............. 360/99.08
5,625,511  4/1997  Brooks et al. ....................... 360/99.08

Primary Examiner—John H. Wolff
Attorney, Agent, or Firm—Ronald O. Neerings; James C. Kesterson; Richard L. Donaldson

[57] ABSTRACT

A disk drive system (50) comprising a spindle (52) having a circular outer perimeter (60) and an axis of rotation. The spindle comprises a first boss (68), a second boss (70), and a third boss (72), each of which is spaced around the circular outer perimeter of the spindle. Moreover, each of the bosses has an upper support surface (68a, 70a, 72a). Lastly, the disk drive system comprises a disk (8b) abutted to each of the upper support surfaces of each of the first, second, and third bosses.

26 Claims, 6 Drawing Sheets

HARD DISK DRIVE WITH KINEMATICALLY MOUNTED DISK PLATTERS

BACKGROUND OF THE INVENTION

The present embodiments relate to mass storage devices in computer systems, and are more particularly directed to a hard disk drive with kinematically mounted disk platters.

Fixed magnetic disk systems, typically referred to as "hard" disk drives, are now commonplace as the main non-volatile storage in modern personal computers, workstations, and portable computers. Such hard disk drives are now capable of storing gigabyte quantifies of digital data, even when implemented in portable computers of the so-called "notebook" class. Many important advances have been made in recent years that have enabled higher data density and thus larger storage capacities of hard disk drives. Technological advances also have enabled much faster hard disk access speeds, both in the bandwidth of data communicated to and from the hard disk drive, and also in the access time of specified disk sectors. Still additional advances have greatly reduced the size and weight of hard disk drives, particularly as applied to portable computers, and have resulted in the widespread availability of portable computers weighing below five pounds while having state-of-the art capability and performance.

Referring to FIG. 1, a conventional hard disk drive system 2 is now described by way of background. Hard disk drive system 2 is contained within a rectangular case 4 which provides structural support, EMI shielding, and contaminant protection for disk drive system 2 when its top cover is included (the top cover is not shown in FIG. 1). Within case 4 are some of the drive electronics 6 (shown in shadow) for signal amplification. Case 4 also encloses multiple disks 8 (only one of which is visible in the plan view of FIG. 1) that are coated with magnetically sensitive material and upon which data is stored at locally magnetized regions. In this example of a conventional disk drive, two disks 8 are utilized and are rotated by a common spindle 10 which is driven by a spindle motor (not visible in the plan view of FIG. 1). Particularly, spindle 10 rotates as shown by an arrow in FIG. 1, where the rotation is about a stationary pin which is not visible in FIG. 1 but which is detailed below in connection with FIG. 2. As further detailed below in connection with FIG. 2 as well as FIG. 3, spindle 10 supports disks 8 by way of a shelf and a spacer (neither of which is visible in the plan view of FIG. 1) as well as a retaining bowed washer 12 and a securing bolt 14. Multiple actuator arms 16 (only one of which is visible in FIG. 1) each have a read/write head 18 mounted upon the arm, where the read/write head 18 that travels in close proximity to a surface of one of disks 8. Thus, as a disk 8 rotates, the read/write head 18 effectively travels on a cushion of air between the disk and the read/write head. Under current technology, the thickness of this air cushion may be only on the order of 0.0000015 to 0.0000030 inches. As to radial distance, note further that each read/write head 18 is positionable at varying radial distances of disks 8 by operation of conventional voice coil motor 20. The position of actuator arms 16 will, of course, control the location of the corresponding read/write heads 18. Typically, multiple actuator arms 16 are interleaved among the multiple disks 8 in disk drive system 2, as is known in the art. Lastly, voice coil motor 20, according to this conventional configuration, is a motor for positioning actuator arms 16 at the desired radial distance of disks 8. Voice coil motor 20 pivots about a rotating bearing cartridge that bears upon a pivot pin 22.

FIG. 2 illustrates a cross-sectional view of disk drive system 2 taken along the dashed line labeled at each of its ends with the legend "2" in FIG. 1. Case 4 provides a bottom surface which supports a vertically extending stationary pin 24, about which spindle 10 rotates in response to a conventional DC motor structure which is shown by way of example in FIG. 2. More specifically, the DC motor structure includes a stator 26 fixed to stationary pin 24 or some other underlying support by press fitting or with an adhesive. Attached upon the inner side wall of spindle 10 is a cylindrical magnet 34. Thus, one skilled in the art will appreciate that magnetic flux will transfer from stator 26 to magnet 34 to cause rotation of spindle 10, and note further that such rotation is about a pair of cylindrically arranged roller bearings 38 and 40.

Looking now more closely to the assembly of spindle 10 in connection with the disks it supports, the following discussion is best appreciated from both the cross-sectional view of FIG. 2 as well as the exploded view of FIG. 3 which also depicts various parts of the prior art assembly of FIG. 2. Thus, note that spindle 10 supports a pair of disks designated 8a and 8b. Specifically, spindle 10 has an annular shelf 42 at its lower and outermost region and the inner diameter of disk 8a is placed around the outer diameter of spindle 10 such that the bottom surface of disk 8a abuts with the upper surface of annular shelf 42. Next, a spacer 44 is disposed above disk 8a by fitting the inner diameter of spacer 44 around the outer diameter of spindle 10 such that the lower surface 46 of spacer 44 generally abuts the upper surface of disk 8a. Still further, disk 8b generally abuts with the upper surface 48 of spacer 44 by fitting the inner diameter of disk 8b around the outer diameter of spindle 10. Lastly, note that the final restraining force to maintain disks 8a, 8b, and spacer 44 in the assembled fashion is provided by bowed washer 12 and securing bolt 14. More specifically, one skilled in the art will appreciate from FIG. 2 that the lower edge 12a of washer 12 applies an annular distributed force to the upper surface of disk 8b, as such force is further assured by the tightening of securing bolt 14.

Given the configuration provided by disk drive system 2 as shown in FIGS. 1 through 3 as well as many known variations of such a configuration, many manufacturers have assembled hard disk systems suitable of achieving satisfactory data storage capacities and disk access times. Nevertheless, as computer technology continues at its rapid pace, there is a constant desire to further improve upon every aspect of the computer, including considerations of its disk drive system. In this regard, note that while disk drive system 2 is acceptable in certain environments, the present invention provides additional improvements thereto.

As one example of the drawbacks of disk drive system 2, it is shown below that the present embodiments improve upon the prior art by reducing both structure weight as well as height. These considerations are very important in the competitive computer market, particularly as portable type computers such as "laptop" computers become more popular. Indeed, there may well be a time in the future when portable and desktop computers converge in consumer demand, such that most if not all computers are expected to be portable in some sense or another. Thus, the benefits of the embodiments provided below may well extend to such future computer configurations as well.

As another example of the drawbacks of disk drive system 2, the present invention recognizes a potentially key limiting effect of the support structure for retaining the disks 8a and 8b (or still additional disks in a larger disk system). For example, in an ideal device, the upper surface of annular shelf 42 is perpendicular to the axis of rotation and is entirely planar, as are the lower and upper surfaces 46 and 48, respectively, of spacer 44. With such an ideal construction, the surfaces of disks 8a and 8b, when rotated, will each define unwavering planes (also called zero flutter). Unfortunately, and despite the improved tolerances achievable in current technology, the surfaces retaining disks 8a and 8b will not be perfectly perpendicular to the axis of rotation or perfectly planar. Instead, each of these three surfaces may vary in their structure, and therefore each may provide a support plane which is not perpendicular to the axis of rotation and which are not parallel to one or more of the other surfaces. In other words, the present invention recognizes a considerable fault in these types of surfaces. Specifically, each of these surfaces provides a continuous 360 degree surface which provides an infinite number of contact points. However, since only three highest points are necessary to define a plane, the three highest points of one structure which contact and thereby support disk 8a are most likely not parallel to the three contact points of another structure supporting disk 8a. Moreover, further compounding this problem is the additional number of disks in the system. Thus, the three contact points of one structure supporting disk 8b are most likely not parallel to the three contact points of another structure supporting disk 8b, and still further therefore the actual rotation of disk 8a will not be parallel to the rotation of disk 8b. In addition, the spindle assembly on hard disk drives are assembled in sequence such that a disk 8a is installed to rest on shelf 42, then a spacer 44 is placed over the disk, then another disk 8b is placed over spacer 44, and this process may be repeated with an additional spacer followed by an additional disk for one or more additional levels until the desired number of disks are installed. Each disk, therefore, rests on a spacer 44 or shelf 42 which defines a plane with three support points. These same disks are constrained by a spacer 44 or bowed washer 12 which define a constraining plane with three points. Since these three constraining points are not forced to be directly above the three points supporting the disk, these six points may contact each corresponding disk in different locations and create local deformations when bowed washer 12 is installed as shown by the following FIG. 4.

FIG. 4 illustrates spindle 10 of FIG. 3 if it were cut and formed into a straight line. Thus, FIG. 4 again illustrates in general the support of disk 8a along its lower surface by shelf 42, and the constraint of disk 8a along its upper surface by the lower surface 46 of spacer 44. Similarly, FIG. 4 illustrates in general the support of disk 8b along its lower surface by the upper surface 48 of spacer 44, and the constraint of disk 8b along its upper surface by the lower edge 12a of bowed washer 12. Moreover, to further demonstrate the principles introduced by the preceding paragraph, FIG. 4 further illustrates various supporting and constraining forces. More particularly, recall from above that a plane (either supporting or constraining) is defined by three points; therefore, in FIG. 4, each supporting plane is represented by three supporting force vectors (identified as $f_s$) and each constraining plane is represented by three constraining force vectors (identified as $f_c$). Further, as noted above, in the prior art these points are not forced to be directly above one another and, indeed, may be at any point along the entire 360 degree angular length of each supporting or constraining surface. Thus, in FIG. 4 the forces are arbitrarily located with respect to each supporting or constraining surface. For example, shelf 42 provides three supporting force vectors $f_{sa1}$, $f_{sa2}$, and $f_{sa3}$. Note that the subscript of each supporting force vector $f_s$ further includes the letter "a" to correspond it to disk 8a as well as an integer number to distinguish it from the other two supporting force vectors. Similarly, lower surface 46 of spacer 44 provides three constraining force vectors $f_{ca1}$, $f_{ca2}$, and $f_{ca3}$. Like the supporting force vectors, note that the subscript of each constraining force vector $f_c$ further includes the letter "a" to correspond it to disk 8a as well as an integer number to distinguish it from the other two constraining force vectors for disk 8a. Given each of the supporting and constraining force vectors, it is now apparent how six contact points impose force upon disk 8a. Moreover, without repeating the same explanation as just provided with respect to disk 8a, note that FIG. 4 further illustrates the six forces upon disk 8b, with those including three supporting force vectors $f_{sb1}$, $f_{sb2}$, and $f_{sb3}$ from upper surface 48 of spacer 44 and three constraining force vectors $f_{cb1}$, $f_{cb2}$, and $f_{cb3}$ from lower edge 12a of washer 12.

Given the various forces of FIG. 4, one skilled in the art should now appreciate the problems described above in connection with the prior art configuration of FIG. 3. Specifically, FIG. 4 illustrates that the supporting and constraining forces imposed upon a disk (either 8a or 8b) are not aligned with one another. This misalignment may cause a disk to locally deform until there is a continuous, non-uniform force at all locations around spindle shelf 42, spacer 44, and bowed washer 12. As a result, when the disk rotates, it will not rotate in a fashion which is perpendicular to the axis of rotation and may appear to wobble or flutter. Note that this lack of correct orientation of the disk may very well affect the data read/write capability of the system, particularly at higher rotational speeds. For example, recall from above that each read/write head 18 is situated to travel only slightly above a rotating disk. However, if the disk is not supported to rotate in a plane which is perpendicular with respect to the axis of rotation, then there are undulations in the distance between the read/write head 18 and its corresponding disk surface. These undulations, therefore, become limiting in the ability of the system to successfully read/write information, particularly as rotational speeds increase. Therefore, if the limitation is exceeded, the head may damage the magnetic surface of the disk or the head itself.

Given the above, the inventive embodiments provided below address various drawbacks of the prior art. Moreover, one skilled in the art will appreciate still additional aspects of the following inventive embodiments, and will further appreciate how those aspects represent advancements over the state of the art.

BRIEF SUMMARY OF THE INVENTION

In one embodiment there is a disk drive system comprising a spindle having a circular outer perimeter and an axis of rotation. The spindle comprises a first boss, a second boss, and a third boss, each of which is spaced around the circular outer perimeter of the spindle and axially in line with other mounting points for the disk. Moreover, each of the bosses has an upper support surface. Lastly, the disk drive system comprises a disk abutted to each of the upper support surfaces of each of the first, second, and third bosses. Various other components are also disclosed and claimed.

DETAILED DESCRIPTION OF THE INVENTION

Figure 5:
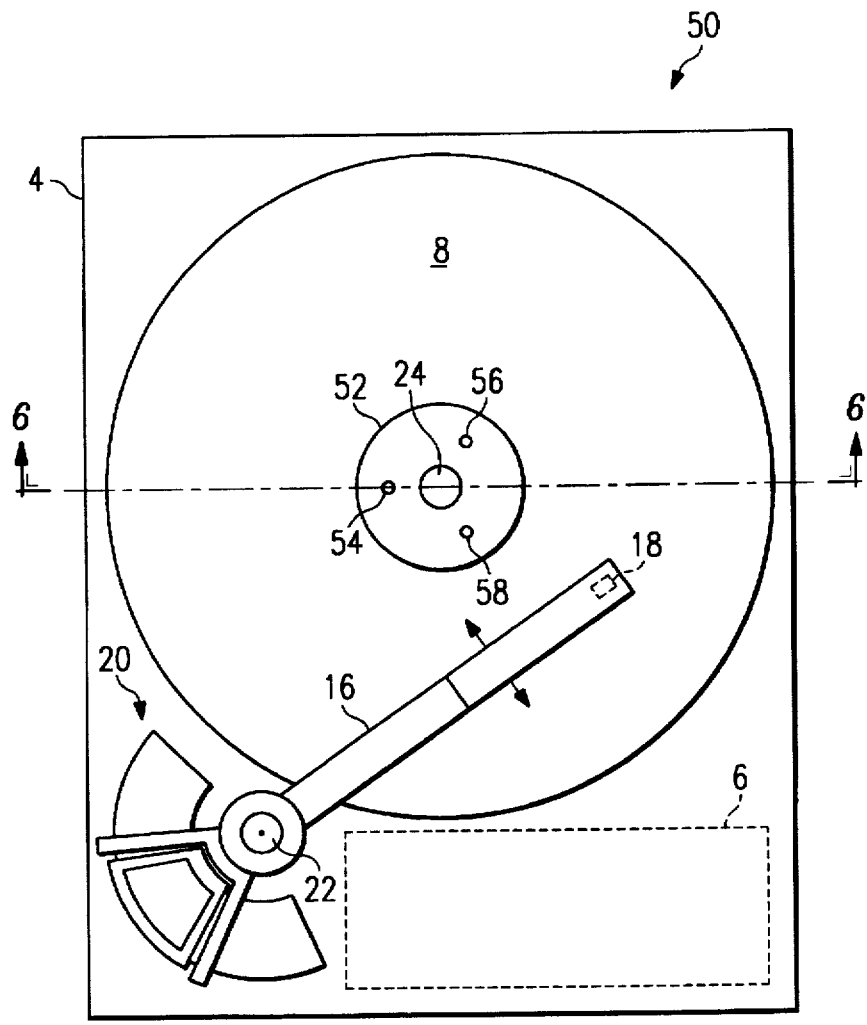
FIG. 5 illustrates a plan view of a disk drive system in accordance with various inventive aspects.
Figure 6:
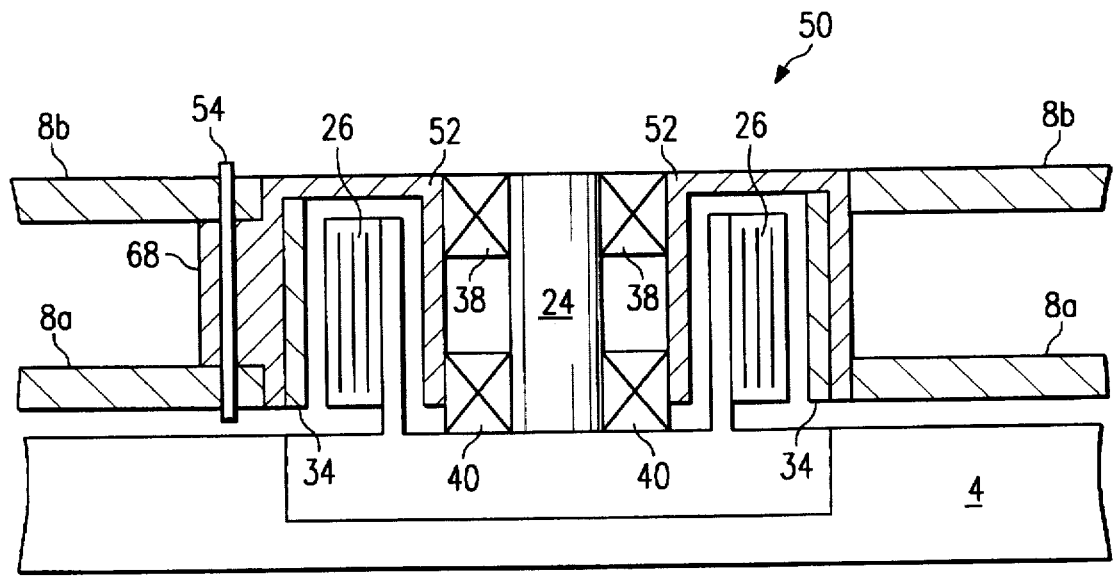
FIG. 6 illustrates a cross-sectional view of the disk drive system of FIG. 5.
Figure 7:
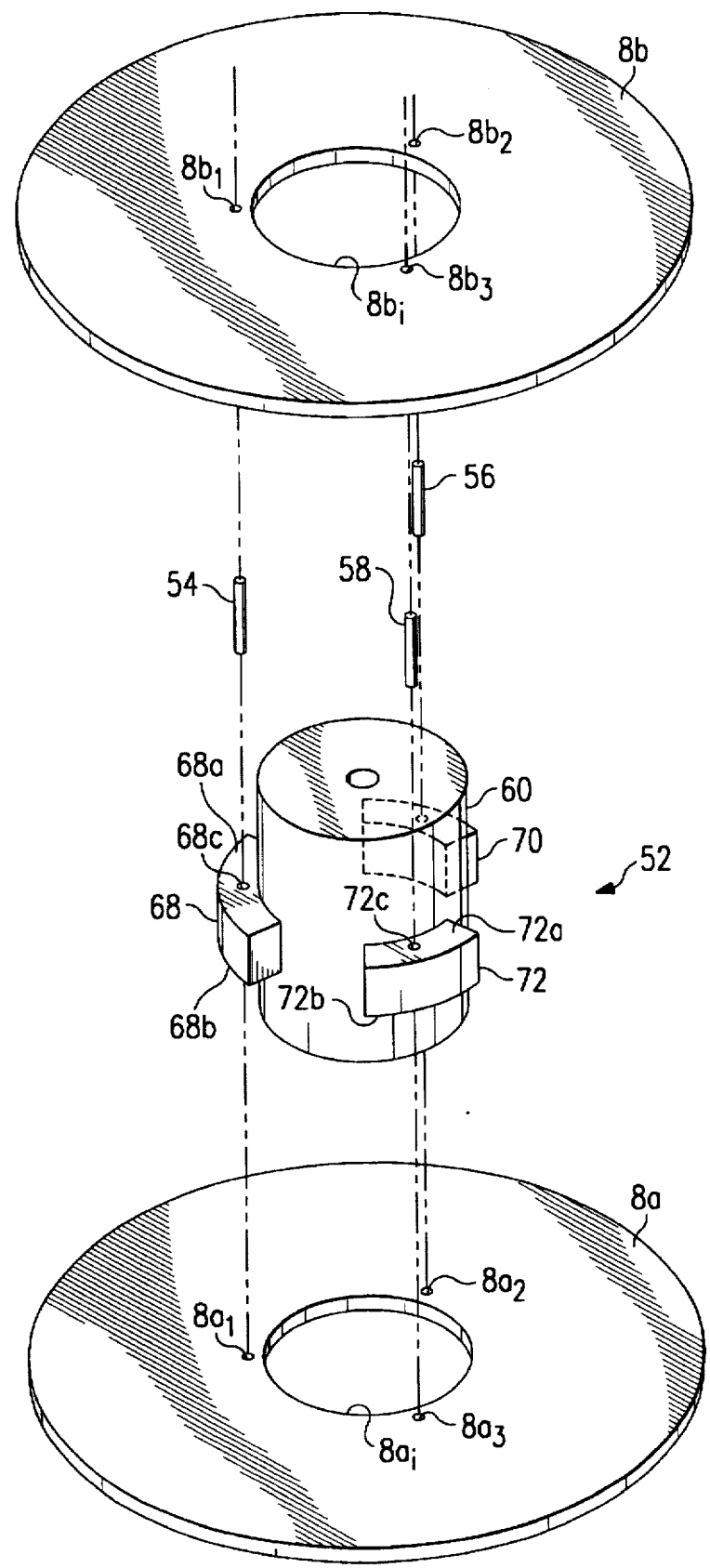
FIG. 7 illustrates an exploded view of the disk drive system of FIG. 5.

FIGS. 5, 6, and 7 illustrate various perspectives of a present inventive embodiment disk drive system designated generally at 50. More specifically, FIG. 5 illustrates a plan view, FIG. 6 illustrates a cross-sectional view taken along the dashed line labeled at each of its ends with the legend "6" in FIG. 5, and FIG. 7 illustrates an exploded view of various parts of the assembly of FIG. 6.

Figure 1:
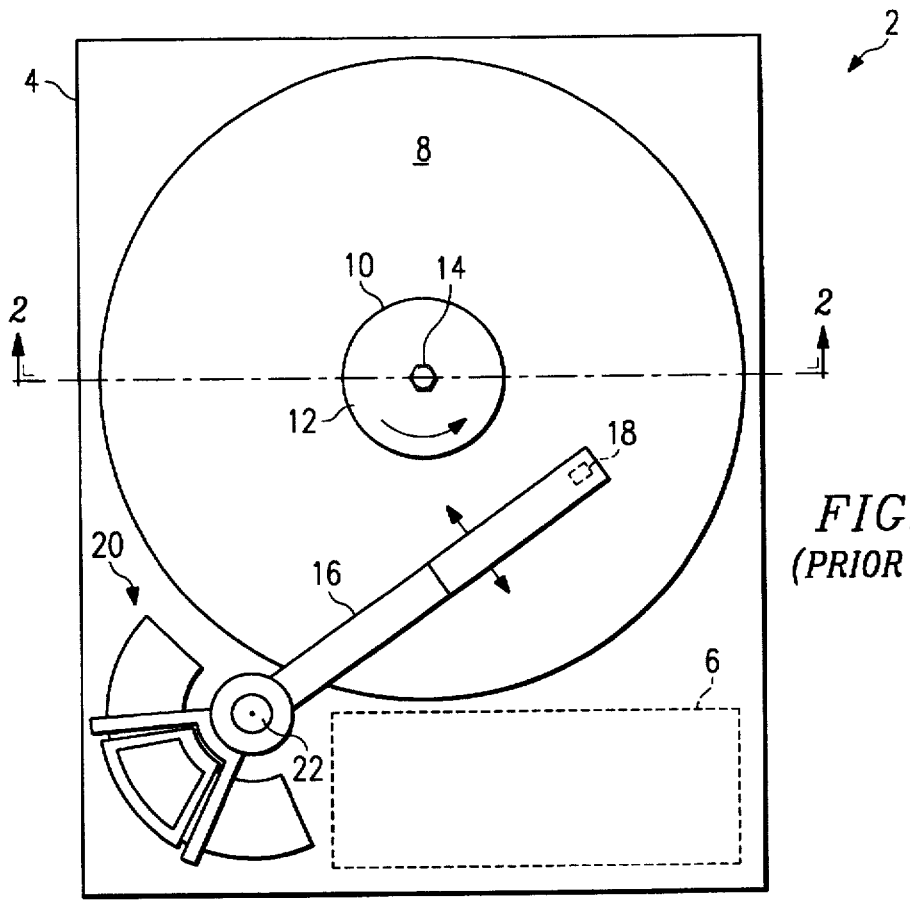
FIG. 1 illustrates a plan view of a prior art disk drive system.
Figure 2:
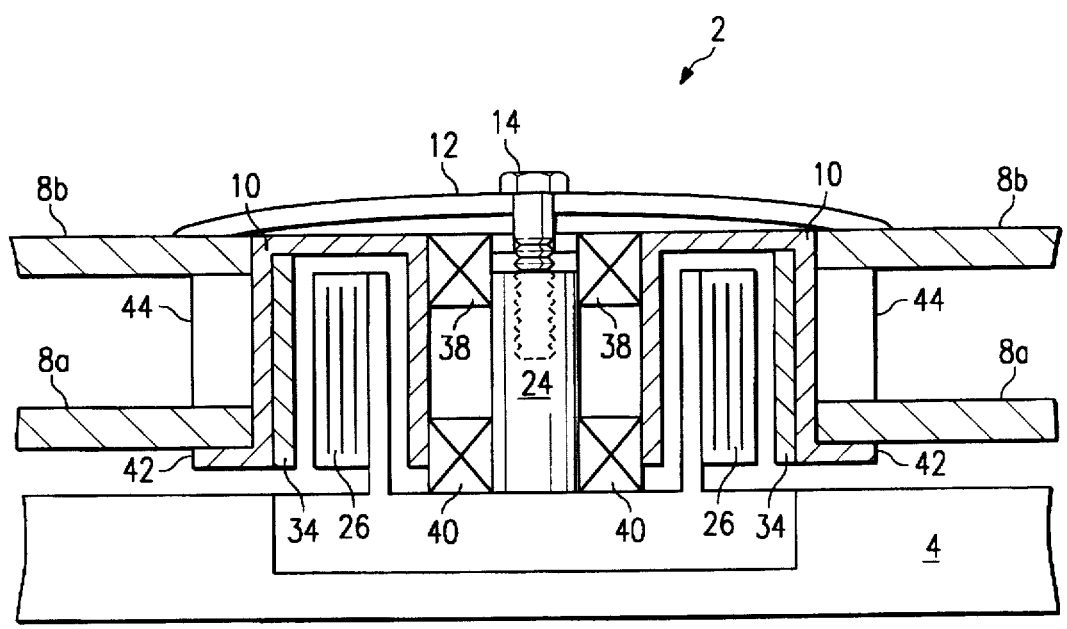
FIG. 2 illustrates a cross-sectional view of the prior art disk drive system of FIG. 1.
Figure 3:
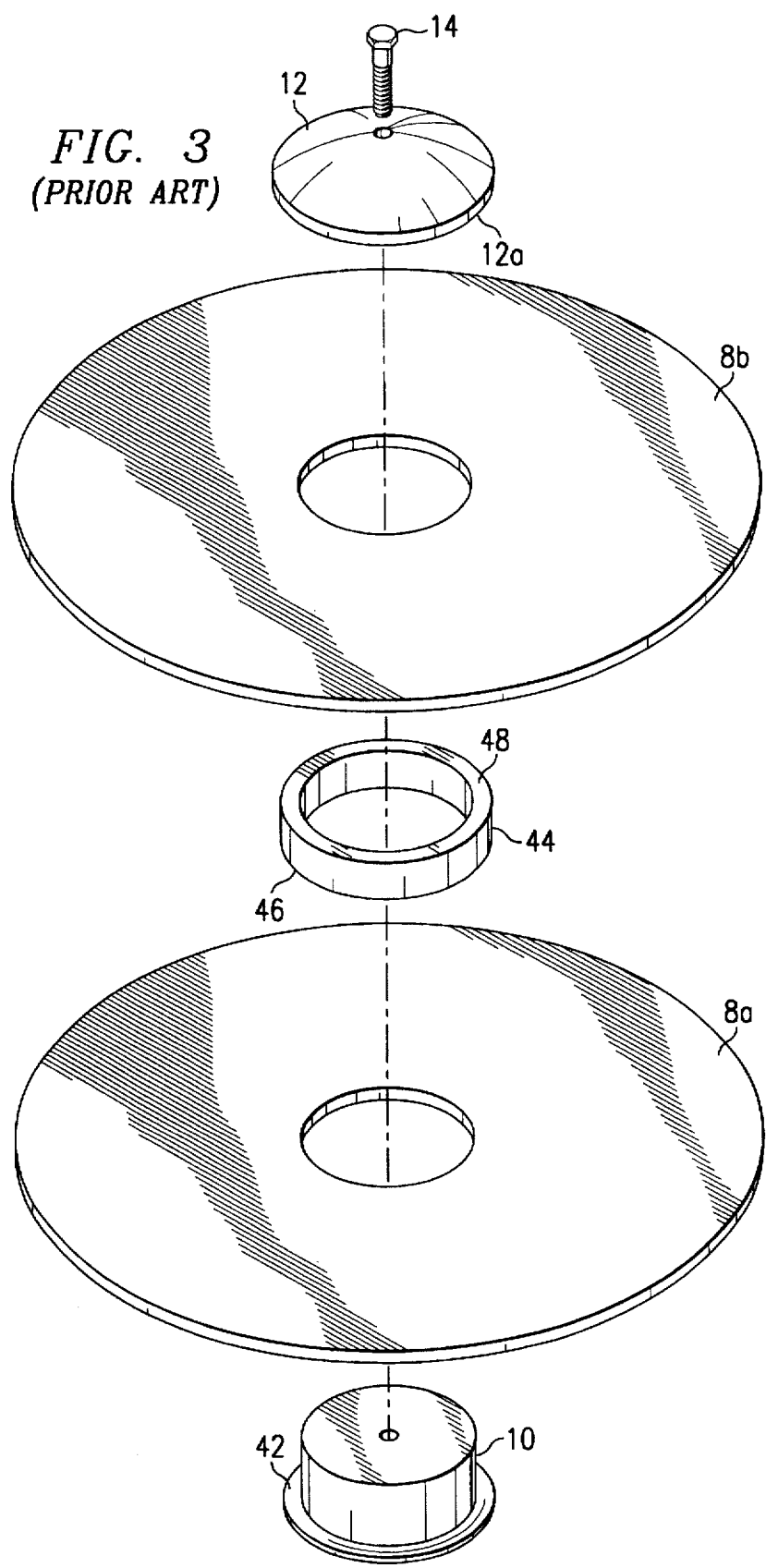
FIG. 3 illustrates an exploded view of the prior art disk drive system of FIG. 1.
Figure 4:
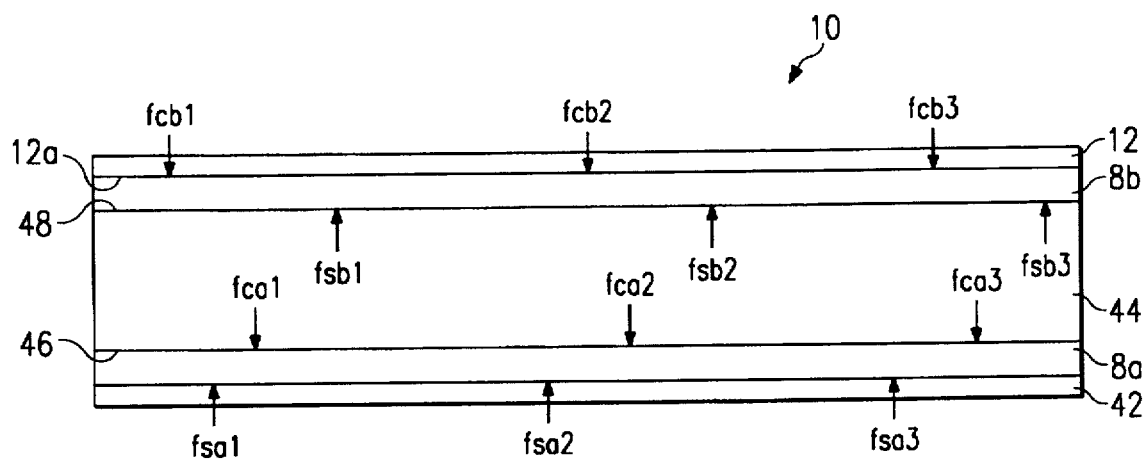
FIG. 4 illustrates the misaligned supporting and constraining forces imposed upon the disks of FIGS. 1 through 3.

Turning first to FIG. 5, disk drive system 50 includes some aspects which are the same as the prior art system discussed in connection with FIGS. 1 through 3. Thus, to simplify the current explanation, where items in system 50 are the same as in the prior art, reference numerals from FIGS. 1 through 3 are carried forward to FIGS. 4 through 6. Briefly revisiting these common aspects, therefore, system 50 includes a case 4 which supports a stationary pin 24 about which a plurality of disks 8 rotate. Again, rotation of disks 8 is in general accomplished through use of a conventional DC motor device, which therefore includes a stator 26 and rotor magnet 34. Case 4 also encloses some of the drive electronics 6. Lastly, system 50 includes a coil motor 20 which pivots about a rotating roller bearing that bears upon a pivot pin 22, once again to position actuator arms 16 as well as their corresponding read/write heads 18 with respect to disks 8.

Looking now to FIG. 5, it further introduces various aspects of the inventive embodiment, as further borne out in FIGS. 6 and 7. Specifically, in FIG. 5, note that system 50 includes a novel spindle 52 which rotates about stationary pin 24. For reasons more clear below, spindle 52 is not retained in the prior art manner and, therefore, FIG. 5 does not shown either a bowed washer or securing bolt as is implemented in the above Figures. In contrast, system 50 includes a least a first pin 54 which assists to secure disk 8 to a boss formed on spindle 52, as better appreciated from the discussion of FIGS. 5 and 6, below.

Looking now to FIG. 7, one skilled in the art will appreciate the assembly of components forming system 50, and reference is first made to spindle 52. Spindle 52 is preferably constructed of a material having a coefficient of thermal expansion at or near that of stationary pin 24. Spindle 52 is generally cylindrical and, therefore, has a circular cross-sectional surface 60 which is preferably on the order of 20.0 mm in diameter. Attached to the outer circular surface 60 of spindle 52 are three arc-shaped bosses 68, 70, and 72. Note that boss 70 is shown in phantom in FIG. 7 because it is along the rear of surface 60 of spindle 52 and, therefore, is not totally visible from the perspective of FIG. 7. In the preferred embodiment, each of bosses 68, 70, and 72 are equally spaced around the perimeter of spindle 52. Moreover, in the preferred embodiment, each of bosses 68, 70, and 72 is 60 degrees in length and, therefore, is separated from its two neighboring bosses by a 60 degree gap. Nevertheless, for reasons detailed later, in an alternative embodiment the angular length of each of bosses 68, 70, and 72 is reduced, thereby increasing the angular space between each successive boss. Each of bosses 68, 70, and 72 has an upper support surface 68a, 70a, and 72a, respectively, as well as a lower support surface 68b, 70b, and 72b, respectively. The upper and lower support surfaces are respectively coplanar and parallel. Further, each of bosses 68, 70, and 72 for a 2.5 inch drive is preferably 1.50 mm in height, where height is intended to be the distance between the upper and lower disks 8b and 8a when they are mounted on the upper and lower surfaces, respectively. The width of each of bosses 68, 70, and 72 is preferably 1.50 mm, where width is intended to be the distance between outer circular surface 60 (which is the point from which a boss extends outwardly) to the outer reach of the corresponding boss. Lastly, note that each of bosses 68, 70, and 72 may include a centrally located hole 68c, 70c, and 72c, respectively, where each such hole is on the order of 0.5 mm in diameter.

FIG. 7, as well as FIG. 6, further assists in illustrating the connection of disks 8a and 8b with respect to spindle 52. Specifically, each of disks 8a and 8b is preferably located on each of bosses 68, 70, and 72 by use of pins 54, 56, and 58, respectively. In this regard, note that each of disks 8a and 8b has a centrally located interior hole 8ai and 8bi, respectively, where that hole is on the order of 20.0 mm in diameter to fit around outer circular surface 60 of spindle 52. For example, with respect to disk 8a, it is positioned so that its interior hole 8ai is disposed upward from the bottom of spindle 52 until disk 8a makes contact with lower surfaces 68b, 70b, and 72b of bosses 68, 70, and 72 respectively. Similarly, with respect to disk 8b, it is positioned so that its interior hole 8bi is disposed downward from the top of spindle 52 until disk 8b makes contact with upper surfaces 68a, 70a, and 72a of bosses 68, 70, and 72 respectively. Moreover, note that disk 8a include three smaller holes $8a_1$, $8a_2$, and $8a_3$, which, upon placing the disk in contact with bosses 68, 70, and 72, co-align with the holes 68c, 70c, and 72c of those bosses. In the preferred embodiment, each of these holes $8a_1$, $8a_2$, and $8a_3$ are on the order of 0.60 mm in diameter. Note that disk 8b similarly includes three smaller holes $8b_1$, $8b_2$, and $8b_3$, again which co-align with holes 68c, 70c, and 72c upon placing disk 8b in contact with bosses 68, 70, and 72.

Having demonstrated the alignment of disks 8a and 8b with respect to bosses 68, 70, and 72 of spindle 52, a detailed discussion now follows regarding securing disks 8a and 8b in place using pins 54, 56, and 58. In the preferred embodiment, each of pins 54, 56, and 58 is on the order of 2.5 mm in length and 0.50 mm in diameter, and is preferably constructed of a material having a coefficient of thermal expansion at or near that of stationary pin 24. Moreover, also in the preferred embodiment, each of pins 54, 56, and 58 is first installed through a respective hole 68c, 70c, and 72c. Thus, given the height of bosses 68, 70, and 72, one skilled in the art will appreciate that once a pin is installed via a press fitting in a corresponding boss hole, the pin protrudes a distance of 0.5 mm from each of the upper and lower planar support surfaces of the boss. For example, when pin 54 is installed through hole 68c, one end of pin 54 will extend 0.5 mm downward from bottom surface 68b while the other end of pin 54 will extend 0.5 mm upward from top surface 68a. After pins 54, 56, and 58 are installed in the manner just described, each of disks 8a and 8b is installed to abut with the boss surfaces as introduced above. Thus, one skilled in the art will now appreciate that each of disks 8a and 8b is initially fitted over the protruding ends of pins 54, 56, and 58. For example, disk 8a is fitted over the bottom ends of pins 54, 56, and 58 to contact with lower planar support surfaces 68b, 70b, and 72b. Recall at this point, however, that the outer diameter of each pin is preferably 0.50 mm while the diameter of the three smaller holes $8a_1$, $8a_2$, and $8a_3$, is 0.60 mm. Thus, the latter diameter is slightly larger than the former. Therefore, rather than some tighter fit such as an interference fit which induces stress into the disk, in the preferred embodiment a loose fit is formed between disk 8a and pins 54, 56, and 58. To further the connection between pins and disk, therefore, in the preferred embodiment a non-outgassing adhesive is applied in the area where each pin end fits through the corresponding larger diameter hole of the disk. For example, a small drop of epoxy or acrylic (not shown) placed in each of the small diameter holes will bond the pin, boss, and disk without distortion to the disk.

As an alternative to the initial pin installation followed by disk installation and adhesive technique described above, note in another embodiment each disk may be affixed to each support surface of bosses 68, 70, and 72 by first placing the disk in contact with those bosses, and then using conical shaped pins to secure the disk in place. In this alternative embodiment, once the disk abuts either all of the upper or lower surfaces of bosses 68, 70, and 72, the narrower end of each conical pin is inserted through the smaller diameter hole of the disk until the pin wedges securely through the disk and into the corresponding boss. Note further that, in this alternative embodiment, the length of each pin is sufficiently short so that it does not contact or otherwise interfere with the pin which is to be inserted into the boss from its opposing support surface. In other words, if disk 8a were first affixed to lower support surfaces 68b, 70b, and 72b using conical pins with the smaller tips pointing upward into bosses 68, 70, and 72 in this manner, then the length of the conical pins to point downward with respect to upper support surfaces 68a, 70a, and 72a should be sufficiently short so as not to contact the upward pointing tips of the pins already installed with respect to lower support surfaces 68b, 70b, and 72b. This use of conical pins provides a quick means of assembly without the use of adhesives which therefore reduces assembly time required for curing and the possibility of damaging a disk surface by inadvertent spilling of adhesive.

Given the above, one skilled in the art will appreciate numerous benefits of the inventive disk drive system 50. For example, note that system 50 is lighter than system 2 of the prior art which reduces the spindle motor's torque requirements. Specifically, system 50 eliminates the use of a bowed washer 12 as well as a securing bolt 14. Moreover, recall that spindle 10 of the prior art includes a shelf 42 and spacer 44 which extend completely around the perimeter of spindle 10. Thus, due to its continuously annular shape, shelf 42 and spacer 44 will contribute more weight to system 10 than bosses 68, 70, and 72 contribute to system 52 because these bosses have spaces between one another and, therefore, do not provide the additional weight in the area of the spaces as does the prior art configuration. In addition to weight benefits, note that system 50 has a lower height requirement of 1 mm for 2.5 inch hard drives which also arises from the elimination of the bowed washer 12 and securing bolt 14. Note that a lower height is further achieved for a two disk hard drive because the shelf 42 is not required for support of the lower disk 8a as it was in the prior art. This further reduces the spindle height by 1.0 to 1.5 mm for 2.5 inch hard drives. Clearly, both the reduction in weight (2 to 3 grams) and height (2.0 to 2.5 mm) is a valuable improvement, particularly in the context of more mobile computers as discussed in the Background above.

As still a further improvement provided by the present embodiments, note that the retaining forces provided to disks 8a and 8b provide a kinematic coupling which will allow the read/write heads to fly closer to the surface of the disks. Specifically, recall that it was observed in the Background above that the retaining surfaces in the prior art will not be perfectly planar and that the lack of rotating parallelism may affect the data read/write capability of the system. Recall also that local deformations are caused by misalignment of the defining points of contact. However, note now that while the support surfaces of bosses 68, 70, and 72 also may not necessarily be perfectly planar, those surfaces are by definition shorter in length than a surface such as shelf 42 which extends around the entire perimeter of the spindle. Thus, by having separate bosses as shown in FIGS. 6 and 7, the location of the points of contact is restricted, thereby reducing the possibility of forming support surfaces for two or more disks which are themselves not planar and perpendicular to the axis of rotation. This concept is further illustrated in FIG. 8, discussed immediately below.

Figure 8:
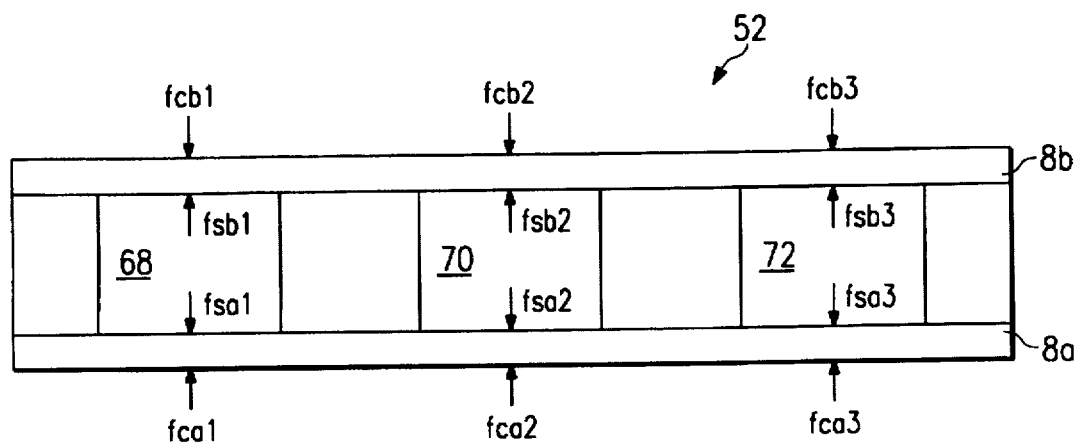
FIG. 8 illustrates the alignment of the supporting and constraining forces imposed upon the disks of FIGS. 5 through 7.

FIG. 8 illustrates spindle 52 of FIG. 7 if it were cut and formed into a straight line and, therefore, FIG. 8 illustrates the support provided by each of bosses 68, 70, and 72. FIG. 8 also uses the same convention as used in FIG. 4 to illustrate supporting force vectors and constraining force vectors. Thus, in FIG. 8 with respect to disk 8a, there are shown three supporting force vectors $f_{sa1}$, $f_{sa2}$, and $f_{sa3}$ and three constraining force vectors $f_{ca1}$, $f_{ca1}$ and $f_{ca3}$. Similarly, in FIG. 8 with respect to disk 8b, there are shown three supporting force vectors $f_{sb1}$, $f_{sb2}$, and $f_{sb3}$ and three constraining force vectors $f_{cb1}$, $f_{cb2}$, and $f_{cb3}$. Note now an important feature of the present embodiment as demonstrated in FIG. 8. Specifically, due to the limited length of bosses 68, 70, and 72, there is a limited location along which a force may be applied to either disk 8a or 8b. Therefore, there is an increased likelihood that a respective pair of constraining and supporting forces are aligned. Indeed, while the present embodiment is described as having bosses which are 60 degrees in length and equally separated by 60 degree gaps, an alternative embodiment would provide bosses shorter than 60 degrees in length, thereby further reducing the possibility of providing a non-planar support surface and further reducing the possibility of misaligned supporting and constraining forces. Additionally, the increased likelihood of alignment is further increased through the use of pins 54, 56, and 58 (not shown in FIG. 8) to centrally locate each pair of constraining and supporting forces along each of bosses 68, 70, and 72, respectively. In all events, one skilled in the art should now appreciate that the forces of FIG. 8 do not create localized deformation and flutter is not induced into the disk. Consequently, given the separated and aligned support structures, the possibilities of uneven pressure, warping, leading to read/write errors, and other disk related problems are reduced by the present embodiments.

Still another benefit of the present embodiments arises from the use of a pin to secure each of disks 8a and 8b. Specifically, note that stationary pin 24 has a center line (i.e., its longitudinal axis) which, for proper operation, should remain fixed with respect to the center line of each disk 8a and 8b (i.e., the center line being a line perpendicular to the interior hole 8ai or 8bi of each disk). Thus, in the prior art, the primary mechanism for maintaining this fixed relationship is the contact between the outer circular surface of spindle 10 and the interior hole of each disk placed around that circular surface, as well as the force applied by bowed washer 12 and securing bolt 14. Note again, however, that the tolerances of the fitting between the outer circular surface of spindle 10 and the interior hole of each disk may be less than ideal. Therefore, if a lateral force is applied to one of the disks, its center line may actually become misaligned with respect to the center line of stationary pin 24. In contrast, however, note the reduction of this possibility given the inventive embodiment of FIGS. 4 through 6. Specifically, each of pins 54, 56, and 58 also have a longitudinal axis which further retain each disk in fixed position with respect to the center line of stationary pin 24. Therefore, system 50 should better withstand a lateral force which may be imposed on one of its disks such that the center line of the disk remains co-aligned with the center line of stationary pin 24.

Still another benefit of the present embodiments are that they may be modified in certain respects while still achieving improvements over the prior art. Some examples are provided earlier, such as an adjustment in the length of bosses 68, 70, and 72. As another example, many of the dimensions provided above are only by way of example, and may be adjusted by one skilled in the art for various configurations. As still another example, while FIGS. 4 through 6 describe a system 52 having three pins 54, 56, and 58, many of the benefits described above could be achieved using only one or two pins. In these alternatives, one skilled in the art may also consider the tradeoffs of using less pins, such as potential imbalance and less lateral retention versus improved weight considerations. As still another example, while FIGS. 4 through 6 describe a system 52 having three equally-spaced bosses 68, 70, and 72, many of the benefits described above could be achieved using more or less bosses and different spacing as well. As yet a final example, while bosses 68, 70, and 72 are shown in FIG. 7 as completely separate by gaps, a smaller rigid coupling could be formed between each boss so as to provide additional structure support, but it should be constructed so that the coupling itself could not make contact with any of the disks.

Figure 9:
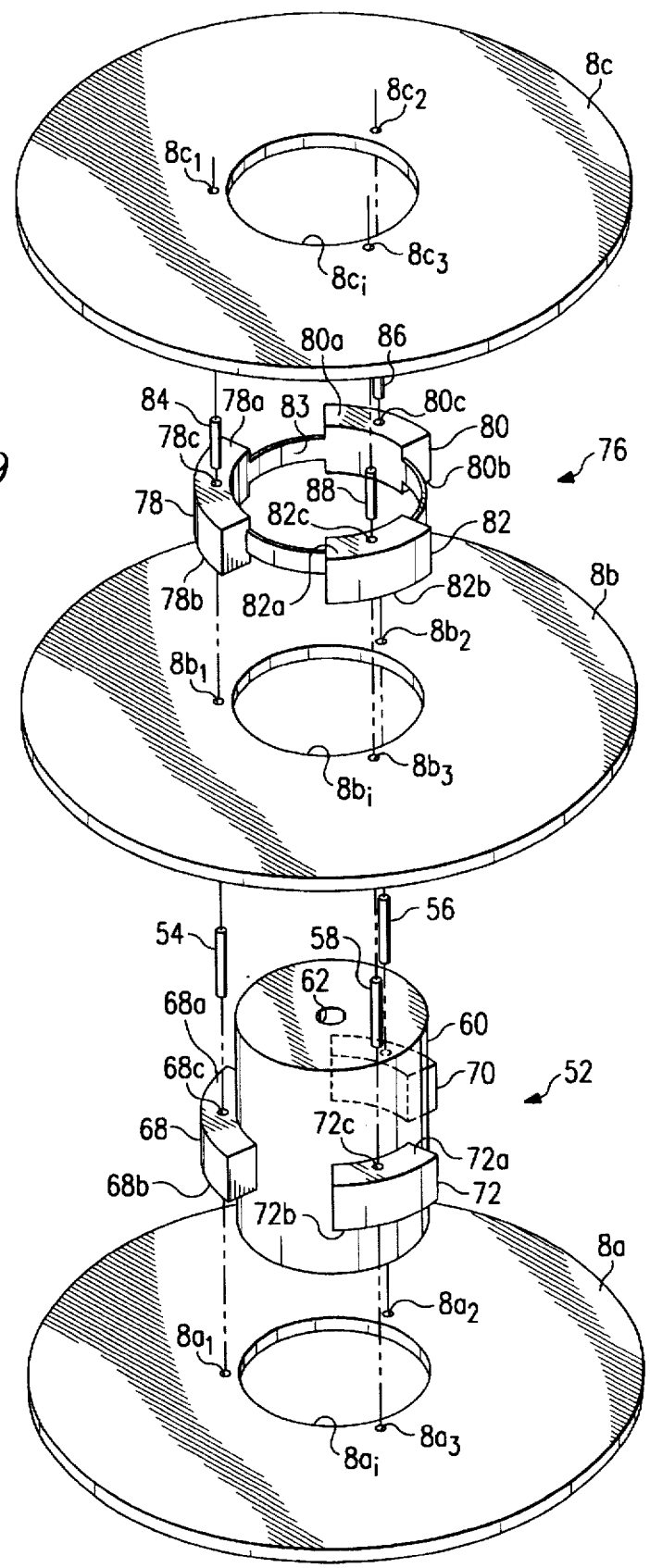
FIG. 9 illustrates an exploded view of an alternative embodiment of the disk drive system of FIG. 7.

As still another demonstration of an alternative configuration using many of the present inventive aspects, FIG. 9 illustrates an exploded view of a system 74 with additional components to accomplish a multiple disk system having more than two disks. Specifically, system 74 includes a third disk 8c, and one skilled in the art will appreciate how the following additions to system 52 may be used further to accommodate any number of additional disks. System 74 further includes a spacer 76 which is disposed above disk 8b once disk 8b is affixed to bosses 68, 70, 72 in one of the manners described above. Spacer 76 also includes three bosses 78, 80, and 82, which correspond in structure size to bosses 68, 70, and 72 of spindle 52, and which are attached to one another by a rigid circular link 83. Spacer 76 is preferably constructed of a material having a coefficient of thermal expansion at or near that of stationary pin 24. Each boss of spacer 76 provides an upper planar support surface shown by combining the boss reference numeral with the letter "a" as well as a lower planar support surface shown by combining the boss reference numeral with the letter "b". Still further, for reasons more clear below, each boss of spacer 76 also includes a centrally located hole 78c, 80c, and 82c, respectively, where each such hole is on the order of 0.50 mm in diameter.

Given the configuration of spacer 76, one skilled in the art will appreciate that, after disk 8b is affixed to pins 54, 56, and 58, spacer 76 is then placed to contact disk 8b so that holes 78c, 80c, and 82c co-align with the upward protruding tips of pins 54, 56, and 58. Indeed, in this regard, note that the length of pins 54, 56, and 58 is preferably increased by 0.25 to 0.50 mm and therefore is greater than that described above; this lengthening permits the pins, when used in combination with a spacer, to extend sufficiently beyond the upper surface of disk 8b and are therefore to mate with holes 78c, 80c, and 82c of spacer 76 to allow alignment of all points of contact and forces. Lastly, note that before spacer 76 is disposed in this manner, an adhesive may be applied to the tips of pins 54, 56, and 58 as they extend over the upper surface of disk 8b. Therefore, this adhesive may further adhere spacer 76 in contact with the upper surface of disk 8b when spacer 76 is fit to mate with the upward protruding tips of pins 54, 56, and 58.

After spacer 76 is connected to the upward protruding tips of pins 54, 56, and 58, one or more pins 78, 80, and 82 is then fitted within holes 78c, 80c, and 82c of upper support surfaces 78a, 80a, and 82a. Pins 78, 80, and 82 are preferably constructed in a similar manner to pins 54, 56, and 58 and, therefore, when inserted before disk 8c is placed upon spacer 76, preferably take the form of a cylindrical pin which press fits into spacer 76. However, again pins 84, 86, and 88 may be conical shaped and inserted after disk 8c is placed in contact with spacer 76. In either event, again only one pin is required, but up to one pin per boss on spacer 76 may be used. In any event, for cylindrical pins, one skilled in the art will appreciate that after the pin or pins are press fitted into spacer 76, disk 8c may be affixed in a manner similar to how disk 8b was affixed to one or more of the pins 54, 56, and 58. Thus, again an adhesive is applied to the top tips of pins 84, 86, and 88 after they are surrounded by the smaller diameter holes $8c_1$, $8c_2$, and $8c_3$. Moreover, in the alternative of conical shaped pins, disk 8c is first placed in contact with upper support surfaces 78a, 80a, and 82a (so that its smaller diameter holes $8c_1$, $8c_2$, and $8c_3$ align with holes 78c, 80c, and 82c) and, thereafter, one or more of the conical shaped pins 84, 86, and 88 is pressed through holes $8c_1$, $8c_2$, and $8c_3$ to affix disk 8c to spacer 76.

From FIG. 9, one skilled in the art will appreciate that the present inventive scope also includes a system having numerous disks. Indeed, note that the spacer concept of FIG. 9 may be repeated for numerous spacers, where each spacer further supports another disk. Note further, however, that if more than three disks were desired, then the conical pins described above are not preferred because an additional spacer may not necessarily connect to the tops of those pins in the same manner as in the case of cylindrical pins. Moreover, note as still an additional alternative that the length of pins 54, 56, and 58 could be considerably extended so that those pins fit through disk 8b, through spacer 76, and through disk 8c as well. Indeed, in this manner, the length of pins 54, 56, and 58 could be further extended to permit still additional disks as well. Lastly, note further that the location of multiple disks may all be above bosses 68, 70, and 72, or may be split with some disks above those bosses and some disks below those bosses.

From the above, it may be appreciated that the above embodiments provide numerous benefits over the prior art, and provide various different alternatives which may be implemented according to the present teachings. Consequently, while the present embodiments have been described in detail, various substitutions, modifications or alterations could be made to the descriptions set forth above without departing from the inventive scope which is defined by the following claims.

I claim:

1. A disk drive system, comprising:
   a spindle having a circular outer perimeter and a spindle axis of rotation; and
   wherein the spindle comprises:
      a first boss;
      a second boss; and
      a third boss;
      wherein each of the first, second, and third bosses is spaced around the circular outer perimeter; and
      wherein each of the bosses has an upper support surface;
   a disk abutted to each of the upper support surfaces of each of the first, second, and third bosses.

2. The disk drive system of claim 1 wherein each of the first, second, and third bosses is equally spaced around the circular outer perimeter.

3. The disk drive system of claim 1:
   wherein each of the first, second, and third bosses has a lower support surface;
   wherein the disk comprises a first disk;
   and further comprising a second disk abutted to each of the lower support surfaces of each of the first, second, and third bosses.

4. The disk drive system of claim 3 wherein, for each of the first, second, and third bosses, each of the lower support surfaces is directly below a corresponding one of the upper support surfaces.

5. The disk drive system of claim 3:
   wherein the first boss has a hole extending in a line parallel to the spindle axis of rotation; and
   further comprising a pin disposed through the hole and coupled to the first disk and the second disk.

6. The disk drive system of claim 5:
   wherein the second boss has a hole extending in a line parallel to the spindle axis of rotation; and
   further comprising a pin disposed through the hole in the second boss and coupled to the first, disk and the second disk.

7. The disk drive system of claim 6:
   wherein the third boss has a hole extending in a line parallel to the spindle axis of rotation; and
   further comprising a pin disposed through the hole in the third boss and coupled to the first disk and the second disk.

8. The disk drive system of claim 1:
   wherein the first boss has a hole extending in a line parallel to the spindle axis of rotation; and
   further comprising a pin disposed through the hole and coupled to the disk.

9. The disk system of claim 8 wherein the pin is coupled to the disk and to the first boss by an adhesive.

10. The disk system of claim 8:
    wherein the pin is conical shaped; and
    wherein the spindle is coupled to the disk by inserting the pin through an aperture in the disk and force fitting the pin into the hole in the first boss.

11. The disk drive system of claim 1:
    wherein the first boss has a hole extending in a line parallel to the spindle axis of rotation; and
    further comprising a first pin disposed through the hole in the first boss and coupled to the disk;
    wherein the second boss has a hole extending in a line parallel to the spindle axis of rotation; and
    further comprising a second pin disposed through the hole in the second boss and coupled to the disk.

12. The disk drive system of claim 11:
    wherein the third boss has a hole extending in a line parallel to the spindle axis of rotation; and
    further comprising a third pin disposed through the hole in the third boss and coupled to the disk.

13. The disk drive system of claim 1:
    wherein the disk comprises a first disk;
    and further comprising:
    a spacer, wherein the spacer comprises:
       a first spacer boss;
       a second spacer boss; and
       a third spacer boss;
       wherein each of the first, second, and third spacer bosses is spaced in a circular manner; and
       wherein each of the first, second, and third spacer bosses has an upper support surface;
       wherein each of the first, second, and third spacer bosses has a lower support surface directly below a corresponding one of the upper support surfaces; and
    a second disk abutted to each of the upper support surfaces of each of the first, second, and third spacer bosses.

14. The disk drive system of claim 13 wherein each of the first, second, and third spacer bosses is co-aligned with a respective one of the first, second, and third bosses.

15. The disk drive system of claim 13 wherein each of the first, second, and third spacer bosses is equally spaced in a circular manner.

16. The disk drive system of claim 1 wherein each of the first, second, and third bosses is sixty degrees long, said sixty degrees long being the radial extent of the arc-shaped bosses as contoured around the spindle perimeter.

17. The disk drive system of claim 1 wherein each of the first, second, and third bosses is less than sixty degrees long, said sixty degrees long being the radial extent of the arc-shaped bosses as contoured around the spindle perimeter.

18. The disk drive system of claim 1:
    wherein the disk comprises a first disk
    and further comprising:
    a plurality of spacers, wherein each of the plurality of spacers comprises:
       a first spacer boss;
       a second spacer boss; and
       a third spacer boss;
       wherein each of the first, second, and third spacer bosses is spaced in a circular manner; and
       wherein each of the first, second, and third spacer bosses has an upper support surface;
       wherein each of the first, second, and third spacer bosses has a lower support surface directly below a corresponding one of the upper support surfaces; and
    a plurality of disks, wherein each of the plurality of disks corresponds to one of the plurality of spacers, and wherein each of the plurality of disks is abutted to each of the upper support surfaces of each of the first, second, and third corresponding spacer bosses.

19. The disk drive system of claim 18 wherein each of the first, second, and third spacer bosses of each of the corresponding plurality of spacers is co-aligned with a respective one of the first, second, and third bosses.

20. A disk drive system, comprising:
a spindle having a circular outer perimeter and a spindle axis of rotation; and
  wherein the spindle comprises:
    a first boss;
    a second boss; and
    a third boss;
    wherein each of the first, second, and third bosses is equally spaced around the circular outer perimeter; and
    wherein each of the bosses has an upper support surface;
    wherein each of the first, second, and third bosses has a lower support surface;
    wherein each of the lower support surfaces is directly below a corresponding one of the upper support surfaces.
  a first disk abutted to each of the upper support surfaces of each of the first, second, and third bosses.
  a second disk abutted to each of the lower support surfaces of each of the first, second, and third bosses.

21. The disk drive system of claim 20:
wherein the first boss has a hole extending in a line parallel to the spindle axis of rotation; and
further comprising a pin disposed through the hole and coupled to the first disk and the second disk.

22. The disk system of claim 21 wherein the pin is coupled to the disk and to the first boss by an adhesive.

23. The disk system of claim 21:
wherein the pin is conical shaped; and
wherein the spindle is coupled to the disk by inserting the pin through an aperture in the disk and force fitting the pin into the hole in the first boss.

24. The disk drive system of claim 21:
wherein the second boss has a hole extending in a line parallel to the spindle axis of rotation; and
further comprising a pin disposed through the hole in the second boss and coupled to the first disk and the second disk;
wherein the third boss has a hole extending in a line parallel to the spindle axis of rotation; and
further comprising a pin disposed through the hole in the third boss and coupled to the first disk and the second disk.

25. The disk system of claim 24:
wherein the pin disposed through the hole in the first boss is coupled to the disk and to the first boss by an adhesive;
wherein the pin disposed through the hole in the second boss is coupled to the disk and to the second boss by an adhesive; and
wherein the pin disposed through the hole in the third boss is coupled to the disk and to the third boss by an adhesive.

26. The disk system of claim 24:
wherein each of the pins connected through each of the holes in the first, second, and third bosses is conical shaped; and
wherein the spindle is coupled to the disk by force fitting each of the pins connected through each of the holes in the first, second, and third bosses through respective apertures in the disk and into the respective hole in each of the first, second, and third bosses.

* * * * *